US011153482B2

(12) United States Patent
Gee et al.

(10) Patent No.: US 11,153,482 B2
(45) Date of Patent: Oct. 19, 2021

(54) OPTIMIZING THE CONTENT OF A DIGITAL OMNIDIRECTIONAL IMAGE

(71) Applicant: Cubic Corporation, San Diego, CA (US)

(72) Inventors: Timothy F. Gee, Oak Ridge, TN (US); Jeffery R. Price, Knoxville, TN (US)

(73) Assignee: Cubic Corporation, San Diego, CA (US)

( * ) Notice: Subject to any disclaimer, the term of this patent is extended or adjusted under 35 U.S.C. 154(b) by 0 days.

(21) Appl. No.: 16/395,826

(22) Filed: Apr. 26, 2019

(65) Prior Publication Data
US 2019/0335101 A1 Oct. 31, 2019

Related U.S. Application Data

(60) Provisional application No. 62/664,007, filed on Apr. 27, 2018.

(51) Int. Cl.
*H04N 5/232* (2006.01)
*G06T 9/00* (2006.01)

(52) U.S. Cl.
CPC .......... *H04N 5/23238* (2013.01); *G06T 9/00* (2013.01); *H04N 5/23235* (2013.01)

(58) Field of Classification Search
None
See application file for complete search history.

(56) References Cited

U.S. PATENT DOCUMENTS

| 5,929,787 | A | * | 7/1999 | Mee | G08G 1/07 340/683 |
| 6,067,111 | A | * | 5/2000 | Hahn | B60R 16/0237 340/901 |
| 6,317,058 | B1 | * | 11/2001 | Lemelson | G08G 1/07 340/905 |
| 6,856,472 | B2 | * | 2/2005 | Herman | G02B 13/06 359/725 |
| 7,893,985 | B1 | * | 2/2011 | Ahiska | H04N 5/2259 348/335 |
| 8,326,077 | B2 | | 12/2012 | Chai et al. | |
| 9,721,393 | B1 | * | 8/2017 | Dunn | G06T 19/006 |
| 10,694,956 | B2 | * | 6/2020 | Dumoulin | A61B 5/0816 |
| 10,798,319 | B2 | * | 10/2020 | Breuer | H04N 5/347 |
| 10,902,270 | B2 | * | 1/2021 | Mishra | G06K 9/00973 |
| 2001/0015751 | A1 | | 8/2001 | Geng | |
| 2002/0063711 | A1 | * | 5/2002 | Park | H04N 5/232 345/428 |

(Continued)

OTHER PUBLICATIONS

Search report IP.com.*

*Primary Examiner* — Mohammad J Rahman
(74) *Attorney, Agent, or Firm* — Kilpatrick Townsend & Stockton

(57) ABSTRACT

Methods and systems of compression mapping for digital omnidirectional images are disclosed. A digital omnidirectional image may be captured and computationally resampled image in accordance with a reducing map. Such resampling may reduce the pixel density in image regions of non-interest and/or increase the pixel density in image regions of interest. Such resampled image may subsequently be compressed for transmission and other processing, which may further be based on the reducing map.

21 Claims, 6 Drawing Sheets

(56) References Cited

U.S. PATENT DOCUMENTS

| | | | |
|---|---|---|---|
| 2002/0075258 A1* | 6/2002 | Park | H04N 5/232 345/419 |
| 2002/0180759 A1* | 12/2002 | Park | G06T 3/0012 345/629 |
| 2005/0094884 A1* | 5/2005 | Takishima | H04N 1/41 382/243 |
| 2005/0099500 A1* | 5/2005 | Fujita | H04N 5/23206 348/207.99 |
| 2006/0034367 A1* | 2/2006 | Park | H04N 19/61 375/240.01 |
| 2008/0015772 A1* | 1/2008 | Sanma | G08G 1/04 701/408 |
| 2008/0170749 A1* | 7/2008 | Albertson | G06K 9/00979 382/103 |
| 2010/0119172 A1 | 5/2010 | Yu et al. | |
| 2011/0181716 A1* | 7/2011 | McLeod | H04N 7/181 348/143 |
| 2011/0205042 A1* | 8/2011 | Takemura | G01S 17/93 340/435 |
| 2011/0282565 A1* | 11/2011 | Law | G08G 5/065 701/117 |
| 2012/0106797 A1* | 5/2012 | Wang | G06K 9/00771 382/103 |
| 2013/0222127 A1* | 8/2013 | Ray Avalani | G08G 1/167 340/436 |
| 2013/0258044 A1* | 10/2013 | Betts-Lacroix | H04N 5/2258 348/36 |
| 2013/0286208 A1* | 10/2013 | Bala | H04N 7/181 348/149 |
| 2015/0281655 A1* | 10/2015 | Turetken | G06K 9/00771 348/159 |
| 2015/0363905 A1* | 12/2015 | Pepperell | G06T 3/0037 345/427 |
| 2015/0373369 A1* | 12/2015 | Jalali | H04N 19/132 375/240.12 |
| 2016/0173882 A1* | 6/2016 | Mishra | H04N 19/136 375/240.08 |
| 2016/0344932 A1* | 11/2016 | Matsumoto | H04N 5/23238 |
| 2016/0352791 A1* | 12/2016 | Adams | H04L 65/4069 |
| 2017/0068861 A1* | 3/2017 | Miller | G06K 9/00785 |
| 2017/0085861 A1* | 3/2017 | Rainisto | G06F 3/017 |
| 2017/0103267 A1* | 4/2017 | Mishra | G06N 20/00 |
| 2017/0128033 A1* | 5/2017 | Ofuji | A61B 6/4233 |
| 2017/0236252 A1* | 8/2017 | Nguyen | H04N 13/383 345/419 |
| 2017/0264843 A1* | 9/2017 | Zhou | H04N 5/3696 |
| 2017/0371518 A1* | 12/2017 | Leppanen | G02B 30/00 |
| 2018/0007389 A1* | 1/2018 | Izumi | H04N 21/2343 |
| 2018/0067488 A1* | 3/2018 | Pollach | G06N 20/00 |
| 2018/0122237 A1* | 5/2018 | Nascimento | G08G 1/0965 |
| 2018/0146198 A1* | 5/2018 | Atluru | G06K 9/00711 |
| 2018/0214005 A1* | 8/2018 | Ebata | A61B 5/1032 |
| 2018/0232194 A1* | 8/2018 | Chen | G06F 3/012 |
| 2018/0359459 A1* | 12/2018 | Lee | H04N 13/111 |
| 2019/0180427 A1* | 6/2019 | Han | H04N 5/208 |
| 2019/0238861 A1* | 8/2019 | D'Acunto | H04N 21/21805 |
| 2019/0281319 A1* | 9/2019 | Galpin | H04N 19/182 |
| 2019/0290215 A1* | 9/2019 | Gilbert | A61B 1/04 |
| 2019/0313097 A1* | 10/2019 | Urban | H04N 19/119 |
| 2019/0342581 A1* | 11/2019 | Deshpande | H04N 19/174 |
| 2019/0364259 A1* | 11/2019 | Chen | H04N 13/161 |
| 2019/0379893 A1* | 12/2019 | Krishnan | H04N 19/132 |
| 2020/0045323 A1* | 2/2020 | Hannuksela | H04N 21/23439 |
| 2020/0053435 A1* | 2/2020 | Denoual | H04N 21/8456 |
| 2020/0059613 A1* | 2/2020 | Dreier | B60R 1/00 |
| 2020/0334979 A1* | 10/2020 | Gon Alves | G08G 1/0133 |

* cited by examiner

OPTIMIZING THE CONTENT OF A DIGITAL OMNIDIRECTIONAL IMAGE

CROSS-REFERENCE TO RELATED APPLICATIONS

The present application claims the priority benefit of U.S. provisional patent application No. 62/664,007 filed Apr. 27, 2018, the disclosure of which is incorporated by reference herein.

BACKGROUND OF THE INVENTION

1. Field of the Disclosure

The present disclosure is generally related to image compression, and more particularly related to compression of an omnidirectional image.

2. Description of the Related Art

Omnidirectional images captured using conventional "fisheye" lenses generally result in images with a much wider angle when compared to images captured by conventional non-fisheye camera lenses. Providing a more curved field of view, such images may provide much higher resolutions within a center region and much lower resolutions in the outer regions toward the edge. An omnidirectional image captured using conventional fisheye lenses is shown in FIG. 1. As illustrated, such an omnidirectional image may cover a broad field of view, but the image may appear more distorted towards the edges of the field of view.

Such omnidirectional images may be captured by overhead cameras placed in diverse areas for a variety of purposes (e.g., traffic monitoring). In traffic monitoring implementations, a fisheye lens of the imaging device may be pointed downward from an overhead position (e.g., over an intersection of a road). The omnidirectional image captured by such an imaging device may include a higher concentration of pixels corresponding to a center of the camera's field of view (e.g., area directly under the camera) and a lower concentration of pixels at the edge of the field of view. This is because the distance from the camera increases as the angle from the optical center increases. Notwithstanding that information at the periphery (e.g., edges) of the field of view may be just as if not more important than the central part, omnidirectional lenses, such periphery information is nevertheless provided at a much lower level of detail than is provided for the center.

Another problem with omnidirectional images is their relatively large sizes (e.g., 5 Mb) compared to unidirectional images. Such large sizes require large storage capacities, amounts of bandwidth for transmission of such images over a communication network, and require more complex image processing techniques and processing resources.

Some current proposed solutions include attempts to implement radial stretching of omnidirectional images at increased angles. There are limits, however, to what can be achieved optically by presently available digital sensors. Images resulting from such proposed solutions may nevertheless exhibit less pixel density along the outer edges than is desired.

As such, there is a need in the art for improved systems and methods of compression mapping for digital omnidirectional images.

SUMMARY OF THE CLAIMED INVENTION

Embodiments of the invention provide for compression mapping of omnidirectional images. Information may be stored in memory regarding a physical site of an omnidirectional camera. Such stored information may identify at least one area within the physical site as being of non-interest. An image may be captured of the physical site via the omnidirectional camera. A reducing map may be generated for the omnidirectional camera based on the stored information regarding the physical site, and the reducing map may identifies a plurality of image portions that each corresponds to a different area of the physical site and specifies at least one of the image portions as subject to pixel reduction. The specified image portion for pixel reduction may correspond to the identified area of non-interest within the physical site. The captured image may be resampled based on the generated reducing map so as to be smaller than the captured image and includes a portion that corresponds to the identified area of non-interest and that has lower pixel density than a corresponding portion of the captured image. The resampled image may be compressed and transmitted to a designated recipient device over a communication network.

Further embodiments may further include methods for compression mapping of omnidirectional images. Such methods may include storing information in memory regarding a physical site of an omnidirectional camera that identifies at least one area within the physical site as being of non-interest, capturing an image of the physical site via the omnidirectional camera, and generating a reducing map that identifies a plurality of image portions that each corresponds to a different area of the physical site and specifies at least one of the image portions that is subject to pixel reduction and that corresponds to the identified area of non-interest within the physical site, and resampling the captured image based on the generated reducing map so as to be smaller than the captured image. The resampled map, which may include a portion that corresponds to the identified area of non-interest and that has lower pixel density than a corresponding portion of the captured image, may be compressed and transmitted to a designated recipient device over a communication network.

Additional embodiments may include systems for compression mapping of omnidirectional images. Such systems may include an omnidirectional camera that includes a lens, a digital sensor, memory that stores information regarding a physical site, a processor, and a communication interface. The memory may store information regarding the physical site where the omnidirectional camera is located where the stored information identifies at least one area within the physical site as being of non-interest. The processor may generate a reducing map for the omnidirectional camera based on the stored information regarding the physical site. Such reducing map may identify a plurality of image portions that each corresponds to a different area of the physical site and specifies at least one of the image portions that is subject to pixel reduction and that corresponds to the identified area of non-interest within the physical site. The processor may further resample the captured image based on the generated reducing map so that the resampled image is smaller than the captured image and includes a portion that corresponds to the identified area of non-interest and that has a lower pixel density than a corresponding portion of the captured image. The resampled image may further be compressed, and the communication interface may transmit the compressed image to a designated recipient device over a communication network.

Yet further embodiments may include non-transitory computer-readable storage media having embodied thereon a program executable by a processor to perform a method for compression mapping of omnidirectional images as described above.

DETAILED DESCRIPTION

Embodiments of the invention provide for compression mapping of omnidirectional images. Information may be stored in memory regarding a physical site of an omnidirectional camera. Such stored information may identify at least one area within the physical site as being of non-interest. An image may be captured of the physical site via the omnidirectional camera. A reducing map may be generated for the omnidirectional camera based on the stored information regarding the physical site, and the reducing map may identifies a plurality of image portions that each corresponds to a different area of the physical site and specifies at least one of the image portions as subject to pixel reduction. The specified image portion for pixel reduction may correspond to the identified area of non-interest within the physical site. The captured image may be resampled based on the generated reducing map, so that the resampled image is smaller than the captured image and includes a portion that corresponds to the identified area of non-interest and that has lower pixel density than a corresponding portion of the captured image. The resampled image may be compressed and transmitted to a designated recipient device over a communication network.

Figure 2:
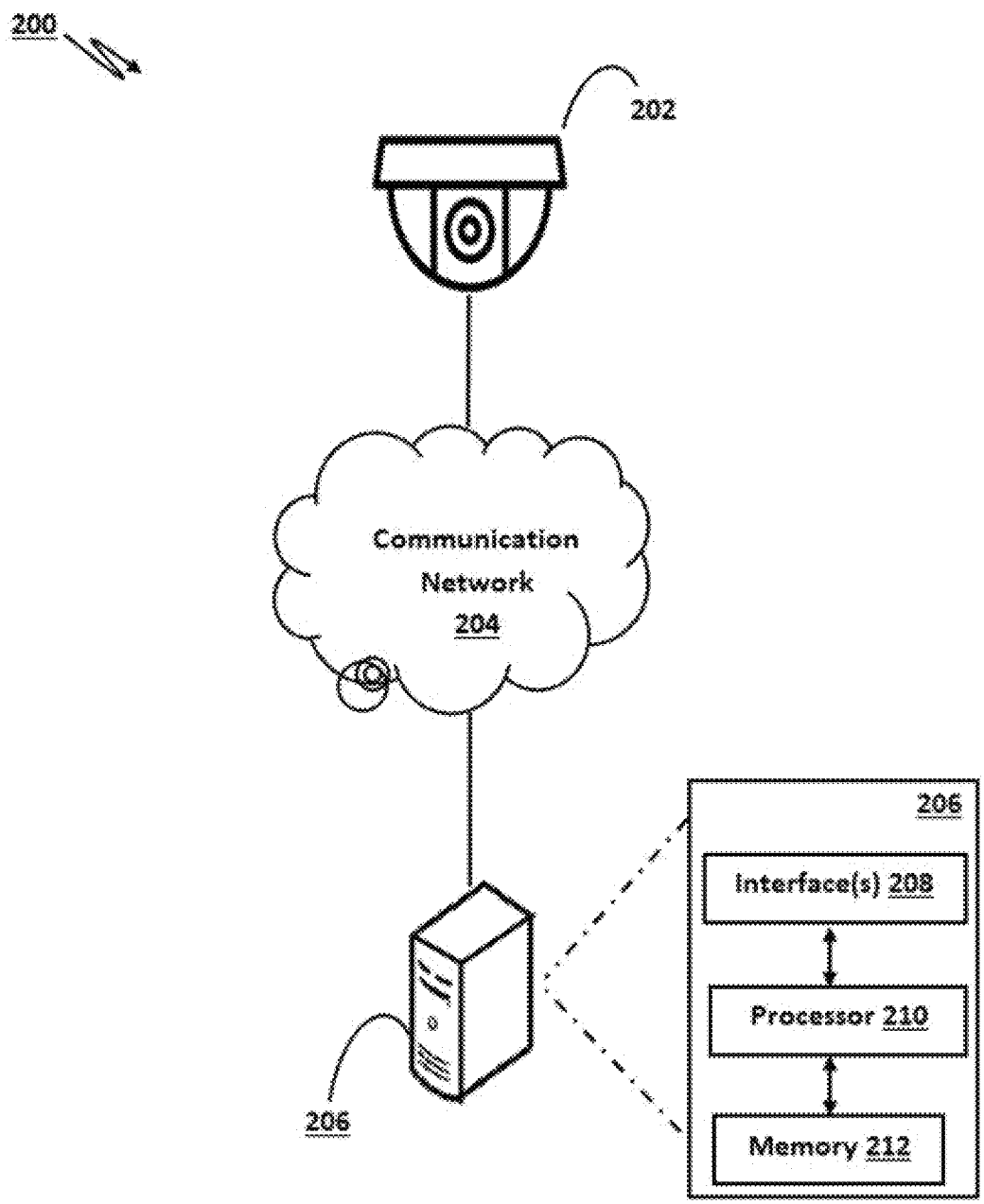
FIG. 2 illustrates an exemplary network environment in which a system of compressing mapping for omnidirectional images may be implemented.

FIG. 2 illustrates an exemplary network environment 200 in which a system of compressing mapping for omnidirectional images may be implemented. The network environment 200 includes an omnidirectional imaging system (e.g., camera) 202, which may be positioned at a specific physical site or geographic location (e.g., affixed to traffic light poles at a specific interaction of roads). Omnidirectional images captured by the omnidirectional imaging system 202 may be transferred via a communication network 204, to a designated recipient system or device 206.

Omnidirectional imaging system 202 may include a number of components (not pictured), which may include a housing capable of being affixed to an overhead position at the monitored site, an omnidirectional lens (e.g., fisheye lens), digital sensor, and communication interface. Images captured by the omnidirectional imaging system 202 may be processed either locally, remotely, or both. As such, one or more recipient devices 206 may be included in network environment 200 in either local or remote relationship to omnidirectional imaging system 202.

The communication network 204 may be a wired and/or a wireless network. The communication network 204, if wireless, may be implemented using communication techniques such as Visible Light Communication (VLC), Worldwide Interoperability for Microwave Access (WiMAX), Long Term Evolution (LTE), Wireless Local Area Network (WLAN), Infrared (IR) communication, Public Switched Telephone Network (PSTN), Radio waves, and other communication techniques known in the art.

The recipient device 206 may include interface(s) 208, processor 210, and a memory 212. The interface(s) 208 may allow for various communications and interactions to be received. Some interface(s) 208 may include user interfaces that accept input from a user or other operator and provide output to the user/operator. The interface(s) 208 may either be a Command Line Interface (CLI), Graphical User Interface (GUI), or a voice interface. Interfaces 208 may further include interfaces for communicating with other devices over communication network 204, including omnidirectional; imaging system 202.

The processor 210 may execute an algorithm stored in the memory 212 for compression mapping of omnidirectional images. The processor 210 may also be configured to decode and execute any instructions received from one or more other electronic devices or server(s). The processor 210 may include one or more general purpose processors (e.g., INTEL® or Advanced Micro Devices® (AMD) microprocessors) and/or one or more special purpose processors (e.g., digital signal processors or Xilinx® System On Chip (SOC) Field Programmable Gate Array (FPGA) processor). The processor 210 may be configured to execute one or more computer-readable program instructions, such as program instructions to carry out any of the functions described in this description.

The memory 212 may include, but is not limited to, fixed (hard) drives, magnetic tape, floppy diskettes, optical disks, Compact Disc Read-Only Memories (CD-ROMs), and magneto-optical disks, semiconductor memories, such as ROMs, Random Access Memories (RAMs), Programmable Read-Only Memories (PROMs), Erasable PROMs (EPROMs), Electrically Erasable PROMs (EEPROMs), flash memory, magnetic or optical cards, or other type of media/machine-readable medium suitable for storing electronic instructions.

In an exemplary embodiment, omnidirectional imaging system 202 may capture an omnidirectional image (e.g., of traffic at the intersection of roads). In one case, the omnidirectional image may be a fisheye image. The omnidirectional imaging system 102 may comprise an omnidirectional lens—which may include conventional fisheye lenses, as well as panamorph lenses and sunex tailored distortion lenses. The omnidirectional imaging system 202 may further comprise a digital image sensor configured to capture such omnidirectional images through the omnidirectional lens. In one case, the digital image sensor may be a Charge Coupled Device (CCD) or Complementary Metal Oxide Semiconductor (CMOS).

In an embodiment, the pixels of the omnidirectional image may be mapped to identified regions within the image where each region corresponds to a different area of the physical site within the field of view of the omnidirectional imaging system 202. For example, the captured image may be an M×N pixel image. A reducing map may be generated to convert the M×N pixel image into a smaller P×Q image, where M is less than P and N is less than Q. The reducing map does not just specify how to reduce the captured image (and any subsequent image captured by omnidirectional imaging system 202), however. The reducing map further specifies an increase or reduction in pixel density in designated regions of interest and non-interest, respectively.

Such a reducing map may specify, for example, that the area directly underneath the omnidirectional imaging system 202 has more pixel density than needed. Such an area may therefore be designated an area of non-interest, and the portion of the captured image corresponding to such area may be subject to resampling so as to reduce pixel density. Other areas (e.g., parts of an intersection that do not need to be monitored) may likewise be designated an area of non-interest. Conversely, other areas may be designated areas of interest, and the image portions corresponding to the same may be resampled so as to increase pixel density, or at least maintain pixel density.

Such a reducing map may be generated based on such factors as omnidirectional optics function, digital sensor information, site information (e.g., position and orientation of the camera pointed directly downward at a specific spot, camera height), and user input. Applying the reducing map to an M×N pixel image—and resampling based thereon—allows for pixels to be eliminated from portions corresponding to regions on non-interest and for pixels to be added to portions of interest. The regions of non-interest may be determined by a user through a user interface. The number of pixels to be eliminated and added may depend on lens or sensor quality, storage, bandwidth, processing power, etc.

The resampled image may then be compressed and transmitted to a recipient device, which may thereafter decompress. Such recipient device may be provided with the reducing map, which may be used for further processing.

In one case, the compressed omnidirectional image may have a size less than around 1 mb. Further, the image size may be varied based on storage requirements. Post such processing; size of the omnidirectional image may be reduced with increase in pixel resolution at the edges of the omnidirectional image, as evident by the compressed omnidirectional image shown in FIG. 5. The compressed omnidirectional image may be stored in the memory 212, transmitted over the communication network 204, and stored at a cloud network server. Further, such compressed omnidirectional image may allow better analysis of details (e.g., traffic).

Figure 3B:
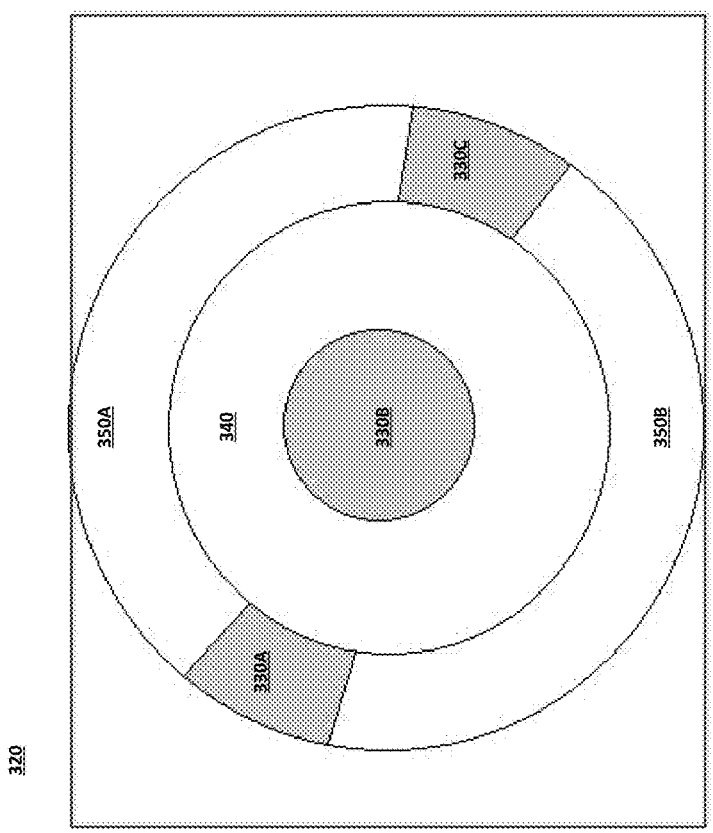
FIG. 3B illustrates a reducing map that may be generated for application to images that may be captured by the omnidirectional camera of FIG. 3A.
Figure 3A:
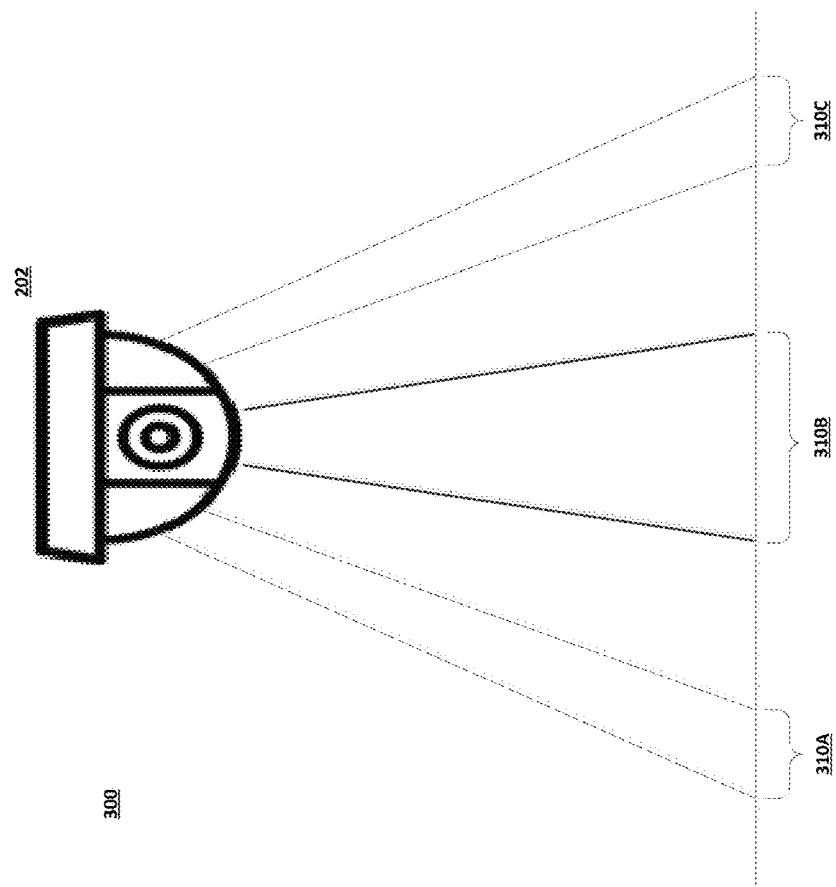
FIG. 3A illustrates an exemplary omnidirectional camera at a physical site comprising a number of identified areas of non-interest.

FIG. 3A illustrates an exemplary omnidirectional camera 202 at a physical site 300 comprising a number of identified areas of non-interest 310A-C. As described above, the omnidirectional camera or imaging system 202 may be positioned overhead a physical site 300. Certain areas 310A-C of the physical site 300 may be designated as being of non-interest. Such designation may be expressly specified by a user, operator, administrator, or may be identified by way of default settings or preferences. Such information may be stored in memory and used as a basis for generating a reducing map that is applicable to images take by omnidirectional imaging system 202 at the physical site 300.

FIG. 3B illustrates an exemplary reducing map 320 that may be generated for application to images that may be captured by the omnidirectional camera of FIG. 3A. Such a reducing map 320 may correspond to images captured of the physical site 300 and may identify a plurality of image portions 330-350 that corresponds to different areas of the physical site 300. As illustrated, the reducing map 320 may identify that greyed-out portions 330A-C (a central portion and two outer portions) have been identified as corresponding to designated areas of non-interest 310A-C. The reducing map 320 may further specify that such portions (illustrated in grey) are subject to pixel reduction. In an exemplary embodiment, reducing map 320 may further specify different types of pixel sampling for the other regions 340-350. For example, reducing map 320 may specify that image portion 340 maintain its pixel density, while image portion 350A be resampled to increase pixel density and image portion 350B be resampled for a different increase in pixel density. Assignment of image portion to their respectively decreased, maintained, or increased pixel density may be based on various factors, including information regarding the optical function or digital sensor of the omnidirectional imaging system 202, information regarding the site, or user input. More image portions may be identified than are illustrated in FIG. 3B.

An omnidirectional image that is captured by omnidirectional imaging system 202 may include M×N pixels. Reducing map 320 identifies how such omnidirectional image may be resampled differently in different portions in a manner as to reduce the size of the omnidirectional image to P×Q pixels where M and N are respectively greater than P and Q. Although smaller in size, the reduced image may include regions that have higher pixel density than the corresponding regions in the originally captured image, as well as regions with lower pixel density than the corresponding regions in the originally captured image.

Figure 4:
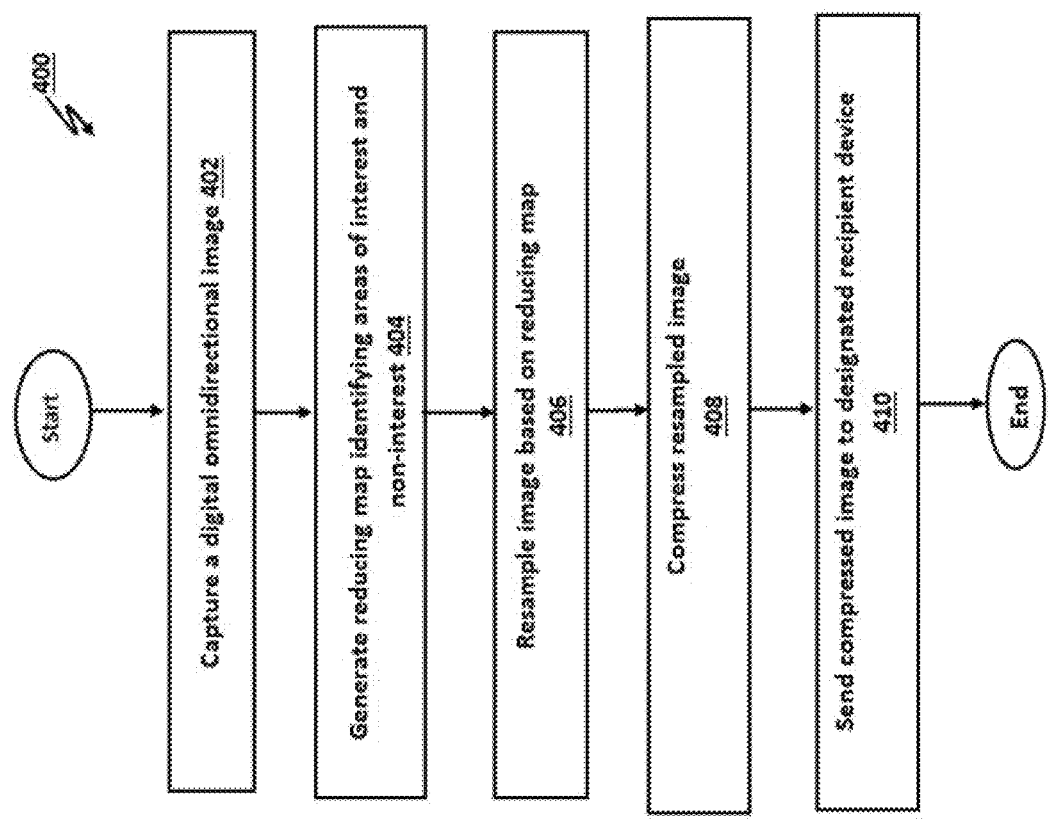
FIG. 4 is a flowchart illustrating an exemplary method for compression mapping for omnidirectional images.

FIG. 4 is a flowchart illustrating an exemplary method 400 for compression mapping for omnidirectional images. The method 400 of FIG. 4 illustrates aspects of the architecture, functionality, and operation for compression mapping of an omnidirectional image. In this regard, each step may correspond to one or more routines, segments, or portions of code including one or more executable instructions for implementing the specified logical function(s). In some implementations, the steps noted may occur in a different order than that illustrated. For example, two steps shown in succession in FIG. 4 may in fact be executed concurrently or in reverse order.

In step 402, an omnidirectional image may be captured at the site 300 where the omnidirectional imaging system 202 is located. Such an image may be an image of traffic at an intersection of roads, for example.

In step 404, a reducing map may be generated for application to images taken by omnidirectional imaging system 202 at the physical site. Such a reducing map may be based on a variety of factors, including information about the omnidirectional imaging system 202 (and its component parts), about the physical site 300, position and orientation of omnidirectional imaging system 202 within the physical site 300, and user input. Such a reducing map may identify multiple image portions and specify different resampling parameters for each image portion. Certain areas of interest or non-interest may be defined by a user through a user interface, for example. The reducing map 320 may therefore specify that the image portions corresponding to such areas be resampled differently based on such designation.

In step 406, the image captured in step 402 is resampled in accordance with the reducing map generated in step 404. The resampled image may be smaller in size than the originally captured image, but may further include different levels of pixel density in each image portion than the corresponding portions of the originally captured image. For example, one or more areas of non-interest 310A-C may correspond to certain image portions that have had pixels eliminated in the resampling. Meanwhile, areas of interest may correspond to other image portions where pixels are maintained or added.

In step 408, the resampled image is compressed, and in step 410, the compressed image may be sent to a designated recipient device. In some embodiments, the designated recipient device may be provided with reducing map for further processing.

Figure 1:
FIG. 1 illustrates an omnidirectional image as may be captured in accordance with the prior art.
Figure 5:
FIG. 5 illustrates an exemplary image that may result from applying methods for compression mapping to the omnidirectional image of FIG. 1.

FIG. 5 illustrates an exemplary image that may result from applying methods for compression mapping to the omnidirectional image of FIG. 1. Such an image may result from resampling in accordance with the reducing map described herein. In addition to being smaller, the pixel density in the center may be decreased, while pixel density along the edges may be increased (e.g., which may result in the appearance of image stretching).

Figure 6A:
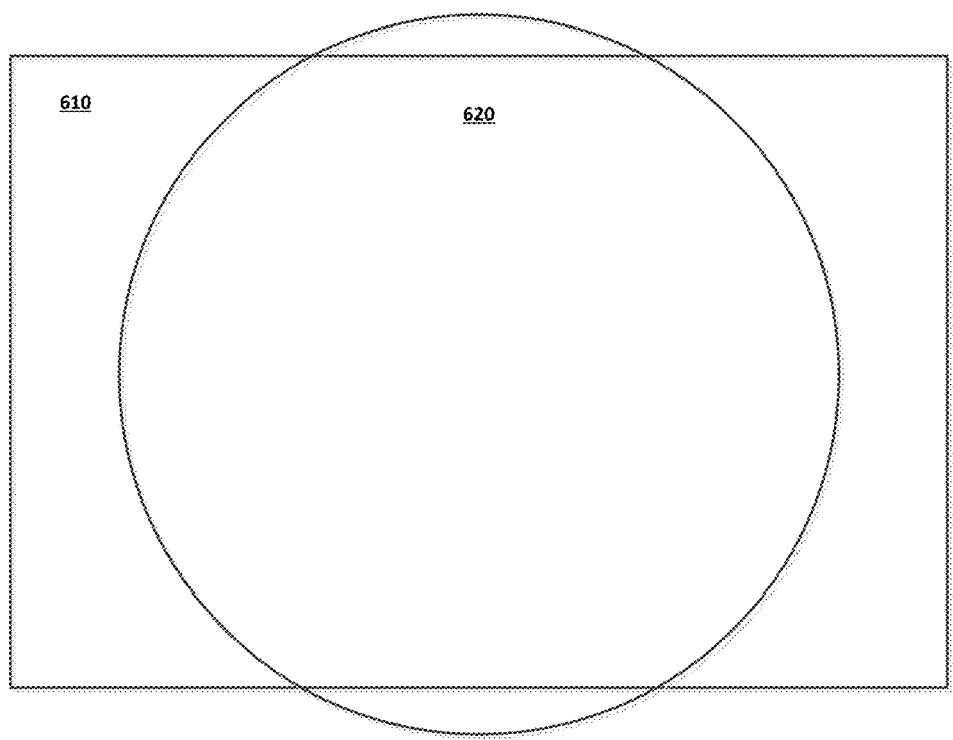
FIG. 6A illustrates an exemplary omnidirectional camera configuration in which the center of the lens and the center of the sensor are in alignment.
Figure 6B:
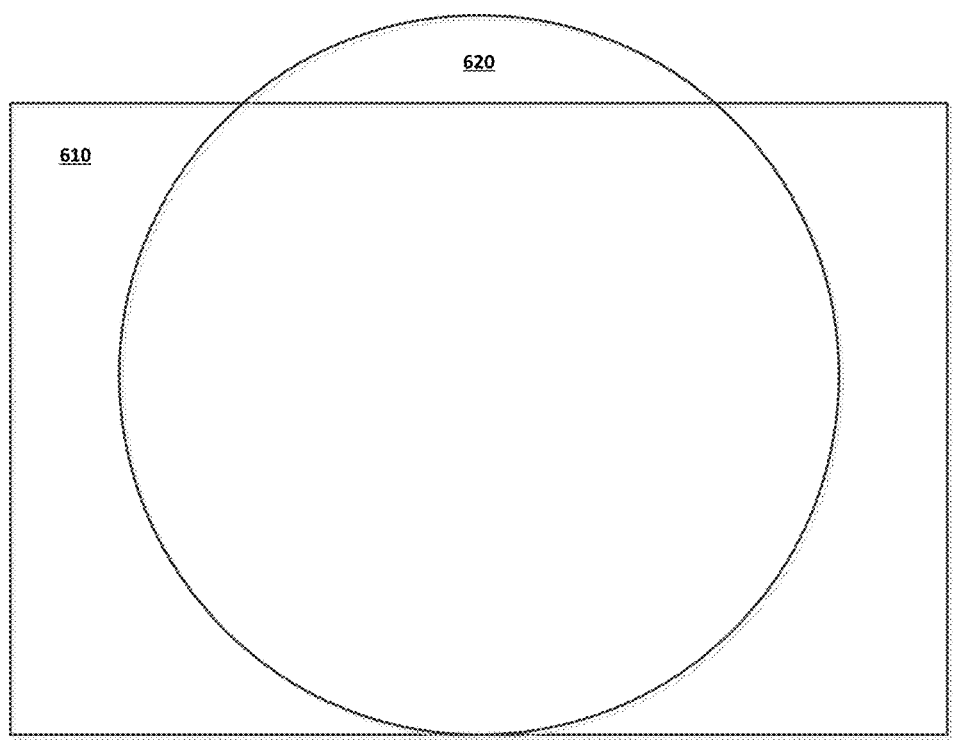
FIG. 6B illustrates an exemplary omnidirectional camera configuration in which the center of the lens and the center of the sensor are not in alignment.

As discussed above, the information upon which the reducing map may be based can include information regarding the specific omnidirectional imaging system and its configuration at the physical site. FIG. 6A illustrates an exemplary omnidirectional camera configuration in which the center of the lens 620 and the center of the sensor 610 are in alignment. FIG. 6B illustrates an exemplary omnidirectional camera configuration in which the center of the lens 620 and the center of the sensor 610 are not in alignment. As illustrated, the image that can be captured in each configuration FIG. 6A-B are slightly different. In some instances, the configuration of FIG. 6B may provide for a better field of view of certain areas of interest at the physical site. As such, the (mis)alignment between the respective centers of the sensor 610 and lens 620 may actually produce a more desirable result.

Embodiments of the present disclosure may be provided as a computer program product, which may include a computer-readable medium tangibly embodying thereon instructions, which may be used to program a computer (or other electronic devices) to perform a process. The computer-readable medium may include, but is not limited to, fixed (hard) drives, magnetic tape, floppy diskettes, optical disks, Compact Disc Read-Only Memories (CD-ROMs), and magneto-optical disks, semiconductor memories, such as ROMs, Random Access Memories (RAMs), Programmable Read-Only Memories (PROMs), Erasable PROMs (EPROMs), Electrically Erasable PROMs (EEPROMs), flash memory, magnetic or optical cards, or other type of media/machine-readable medium suitable for storing electronic instructions (e.g., computer programming code, such as software or firmware). Moreover, embodiments of the present disclosure may also be downloaded as one or more computer program products, wherein the program may be transferred from a remote computer to a requesting computer by way of data signals embodied in a carrier wave or other propagation medium via a communication link (e.g., a modem or network connection).

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method for compression mapping of omnidirectional images at a traffic intersection of a road, the method comprising:

storing information in memory regarding a physical site of an omnidirectional camera pointed over the traffic intersection, wherein the stored information identifies a plurality of areas of the traffic intersection within the physical site, wherein a first area of the plurality of areas is identified as being of non-interest, and a second area, and a third area of the plurality of areas are identified as being of interest;

capturing an image of the physical site via the omnidirectional camera, wherein a first portion of the captured image oversamples the first area of non-interest, a second portion of the captured image under samples the second area of interest, and a third portion of the captured image maintains samples of the third area of interest;

executing instructions stored in memory, wherein execution of the instructions by a processor:

resamples the captured image based on a reducing map for the omnidirectional camera, wherein the resampled image includes:

a first image portion corresponding to the first area of non-interest, the first image portion having a lower pixel density than the first portion of the captured image, a second image portion corresponding to the second area of interest, the second image portion having a higher pixel density than the second portion of the captured image, and a third image portion corresponding to the third area of interest, the third image portion having a pixel density maintained as the third portion of the captured image, wherein the first image portion, the second image portion and the third image portion corresponds with the plurality of areas of the traffic intersection, and compresses the resampled image; and transmitting the compressed image to a designated recipient device over a communication network.

2. The method of claim 1, further comprising generating the reducing map for the omnidirectional camera based on the stored information regarding the physical site, wherein the reducing map identifies a plurality of image portions that each corresponds to a different area of the physical site and specifies at least one of the image portions as subject to pixel reduction, the specified image portion corresponding to the identified area of non-interest within the physical site.

3. The method of claim 1, further comprising receiving user input regarding the physical site, wherein the stored information identifying the at least one area of non-interest is based on the received user input.

4. The method of claim 1, wherein the stored information further identifies at least one other area within the physical site as being of interest, wherein the reducing map further specifies at least one other image portion subject to pixel increase, the specified other image portion corresponding to the identified area of interest within the physical site.

5. The method of claim 4, wherein the at least one other image portion subject to pixel increase is located along an outer edge of the captured image.

6. The method of claim 4, wherein the resampled image further includes another portion corresponding to the identified area of interest, the included other portion having higher pixel density than a corresponding portion of the captured image.

7. The method of claim 1, wherein the identified area of non-interest is located directly beneath the omnidirectional camera.

8. The method of claim 1, further comprising decompressing the compressed image at the recipient device; and processing the decompressed image based on the reducing map.

9. The method of claim 1, wherein the stored information further includes information identifying a position of the omnidirectional camera at the physical site, and wherein generating the reducing map is further based on the identified position of the omnidirectional camera.

10. The method of claim 9, further comprising aligning a digital sensor of the omnidirectional camera relative to a lens of the omnidirectional camera, wherein a center of the digital sensor is offset from a center of the lens.

11. A system for compression mapping of omnidirectional images at a traffic intersection of a road, the system comprising:
  memory that stores information regarding the physical site of an omnidirectional camera pointed over the traffic intersection, wherein the stored information identifies a plurality of areas of the traffic intersection within the physical site, wherein a first area of the plurality of areas is identified as being of non-interest, and a second area, and a third area of the plurality of areas are identified as being of interest;
  a digital sensor of the omnidirectional camera that captures an image of the physical site, wherein the image oversamples the identified central area of non-interest;
  a processor that executes instructions stored in memory, wherein execution of the instructions by the processor:
    resamples the captured image based on a reducing map for the omnidirectional camera, wherein the resampled image includes:
      a first image portion corresponding to the first area of non-interest, the first image portion having a lower pixel density than the first portion of the captured image,
      a second image portion corresponding to the second area of interest, the second image portion having a higher pixel density than the second portion of the captured image, and
      a third image portion corresponding to the third area of interest, the third image portion having a pixel density maintained as the third portion of the captured image, wherein the first image portion corresponds with the plurality of areas of the traffic intersection, and compresses the resampled image; and
  a communication interface that transmits the compressed image to a designated recipient device over a communication network.

12. The system of claim 11, wherein the processor further generates the reducing map for the omnidirectional camera based on the stored information regarding the physical site, wherein the reducing map identifies a plurality of image portions that each corresponds to a different area of the physical site and specifies at least one of the image portions as subject to pixel reduction, the specified image portion corresponding to the identified area of non-interest within the physical site.

13. The system of claim 11, further comprising a user interface that receives user input regarding the physical site, wherein the stored information identifying the at least one area of non-interest is based on the received user input.

14. The system of claim 11, wherein the stored information further identifies at least one other area within the physical site as being of interest, and wherein the reducing map further specifies at least one other image portion subject to pixel increase, the specified other image portion corresponding to the identified area of interest within the physical site.

15. The system of claim 14, wherein the at least one other image portion subject to pixel increase is located along an outer edge of the captured image.

16. The system of claim 14, wherein the resampled image further includes another portion corresponding to the identified area of interest, the included other portion having higher pixel density than a corresponding portion of the captured image.

17. The system of claim 11, wherein the identified area of non-interest is located directly beneath the omnidirectional camera.

18. The system of claim 11, wherein the recipient device decompresses the compressed image at the recipient device, and processes the decompressed image based on the reducing map.

19. The system of claim 11, wherein the stored information further includes information identifying a position of the omnidirectional camera at the physical site, and wherein the processor generates the reducing map further based on the identified position of the omnidirectional camera.

20. The system of claim 11, wherein the digital sensor is positioned relative to a lens of the omnidirectional camera such that a center of the digital sensor is not aligned to a center of the lens.

21. A non-transitory computer-readable storage medium, having embodied thereon a program executable by a processor to perform a method for compression mapping of omnidirectional images at a traffic intersection of a road, the method comprising:
  storing information in memory regarding a physical site of an omnidirectional camera pointed over the traffic intersection, wherein the stored information identifies a plurality of areas of the traffic intersection within the physical site, wherein a first area of the plurality of areas is identified as being of non-interest, and a second area, and a third area of the plurality of areas are identified as being of interest;
  capturing an image of the physical site via the omnidirectional camera, wherein a first portion of the captured image oversamples the first area of non-interest, a second portion of the captured image under samples the second area of interest, and a third portion of the captured image maintains samples of the third area of interest;
  resampling the captured image based on a reducing map for the omnidirectional camera, wherein the resampled image includes:
    a first image portion corresponding to the first area of non-interest, the first image portion having a lower pixel density than the first portion of the captured image,
    a second image portion corresponding to the second area of interest, the second image portion having a higher pixel density than the second portion of the captured image, and
    a third image portion corresponding to the third area of interest, the third image portion having a pixel density maintained as the third portion of the captured image, wherein the first image portion corresponds with the plurality of areas of the traffic intersection;

compressing the resampled image; and
transmitting the compressed image to a designated recipient device over a communication network.

* * * * *